(12) United States Patent
Drolet

(10) Patent No.: US 11,619,240 B2
(45) Date of Patent: Apr. 4, 2023

(54) COMPRESSOR DIFFUSER WITH PLASMA ACTUATORS

(71) Applicant: PRATT & WHITNEY CANADA CORP., Longueuil (CA)

(72) Inventor: Martin Drolet, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/407,525

(22) Filed: Aug. 20, 2021

(65) Prior Publication Data

US 2021/0381525 A1    Dec. 9, 2021

Related U.S. Application Data

(62) Division of application No. 16/193,363, filed on Nov. 16, 2018, now Pat. No. 11,125,247.

(51) Int. Cl.

| | |
|---|---|
| *F04D 27/02* | (2006.01) |
| *F04D 29/44* | (2006.01) |
| *F01D 17/16* | (2006.01) |
| *F02C 3/04* | (2006.01) |
| *F04D 17/10* | (2006.01) |
| *F04D 29/68* | (2006.01) |
| *F01D 17/12* | (2006.01) |

(52) U.S. Cl.
CPC .......... *F04D 29/441* (2013.01); *F01D 17/12* (2013.01); *F01D 17/162* (2013.01); *F02C 3/04* (2013.01); *F04D 17/10* (2013.01); *F04D 27/02* (2013.01); *F04D 29/687* (2013.01); *F05D 2220/32* (2013.01); *F05D 2270/172* (2013.01)

(58) Field of Classification Search
CPC ...... F04D 29/441; F04D 27/02; F04D 29/687; F01D 17/12; F01D 17/162; F05D 2220/172

See application file for complete search history.

(56) References Cited

U.S. PATENT DOCUMENTS

| | | |
|---|---|---|
| 7,984,614 B2 | 7/2011 | Nolcheff |
| 8,006,497 B2 | 8/2011 | Nolcheff et al. |
| 2010/0170224 A1 | 7/2010 | Clark et al. |
| 2010/0172747 A1 | 7/2010 | Clark et al. |
| 2016/0153360 A1 | 6/2016 | Jothiprasad et al. |

*Primary Examiner* — Sabbir Hasan
(74) *Attorney, Agent, or Firm* — Norton Rose Fulbright Canada LLP

(57) ABSTRACT

There is disclosed a centrifugal compressor including an impeller rotatable about an axis and a diffuser downstream of the impeller. The diffuser has walls delimiting flow passages. Plasma actuators are positioned adjacent the walls and are operatively connectable to a source of electricity. The plasma actuators have a first electrode, a second electrode, and a dielectric layer therebetween. The first electrode is upstream of the second electrode. The first electrode is exposed to the flow passage. The second electrode is shielded from the flow passage by the dielectric layer. The plasma actuators are operable to generate an electric field through the dielectric layer. The plasma actuators are located closer to inlets of the flow passage than to outlets of the flow passages. A method of operating the compressor is disclosed.

13 Claims, 3 Drawing Sheets

COMPRESSOR DIFFUSER WITH PLASMA ACTUATORS

CROSS-REFERENCE TO RELATED APPLICATIONS

This application is a divisional application of U.S. patent application Ser. No. 16/193,363 filed on Nov. 16, 2018, the entire contents of which are incorporated by reference herein.

TECHNICAL FIELD

The application relates generally to gas turbine engines and, more particularly, to systems and methods used for improving a stall margin in centrifugal compressors of such engines.

BACKGROUND

A centrifugal compressor typically includes an impeller and a diffuser pipe assembly downstream of the impeller. The diffuser pipe assembly is configured for redirecting the flow of compressed air exiting the impeller from a substantially radial direction to a substantially axial direction relative to an axis of rotation of the impeller. In some operating conditions, the flow within pipes of the diffuser pipe assembly may separate from walls of the pipes. This may result in a reduced mass flow rate of air within the pipes, which may cause stall of the centrifugal compressor.

SUMMARY

In accordance with a first embodiment, there is provided a centrifugal compressor comprising: an impeller rotatable about an axis, the impeller having an impeller outlet; a diffuser downstream of the impeller relative to the flow of compressed air, the diffuser including walls delimiting flow passages fluidly connected at an inlet to the impeller outlet and configured for receiving the flow of compressed air for delivery to an outlet of the flow passage; and a plurality of plasma actuators positioned adjacent the walls and operatively connectable to a source of electricity, the plasma actuators having a first electrode, a second electrode, and a dielectric layer therebetween, the first electrode upstream of the second electrode, the first electrodes exposed to the flow passage, the second electrode shielded from the flow passages by the dielectric layer, the plasma actuators operable to generate an electric field through the dielectric layer, the plasma actuators located closer to the inlet than the outlet.

In accordance with a second embodiment, there is provided a stall control system for controlling stall of a centrifugal compressor of a gas turbine engine, the centrifugal compressor having an impeller and a diffuser downstream of the impeller, the stall control system comprising: plasma actuators located in boundary layer regions in vicinity of walls bounding flow passages of the diffuser; and a controller operatively connected to the plasma actuators, the controller having a processor and a computer readable medium operatively connected to the processor, the computer readable medium having instructions stored thereon for: detecting an impending stall situation of the centrifugal compressor, and activating the plasma actuators for generating electric fields between first and second electrodes of the plasma actuators.

In accordance with a third embodiment, there is provided a method of operating a centrifugal compressor of a gas turbine engine, the centrifugal compressor having an impeller and a diffuser downstream of the impeller, the method comprising: receiving a flow of air exiting the impeller; separating the flow of air in sub-flows and receiving each of the sub-flows within a respective one of flow passages of the diffuser; and generating electric fields in boundary layer regions in vicinity of walls bounding the flow passages and at locations closer to the impeller than to outlets of the flow passage thereby ionizing particles of air in the boundary layer regions for accelerating the sub-flows in the boundary layer regions.

DESCRIPTION OF THE DRAWINGS

Reference is now made to the accompanying figures in which.

DETAILED DESCRIPTION

Figure 1:
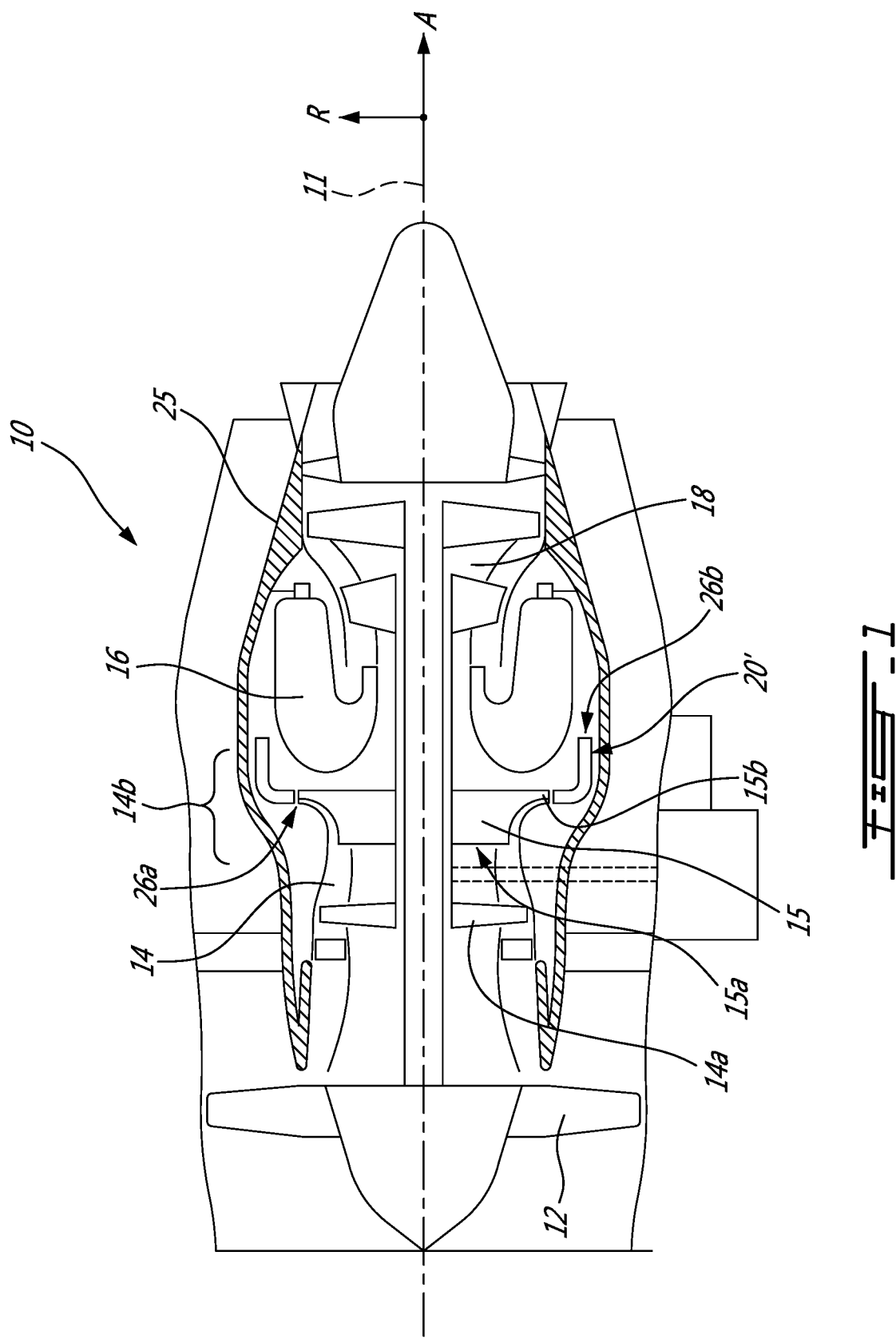
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

Still referring to FIG. 1, the compressor section 14 includes a low pressure compressor 14a and a high pressure compressor 14b. The low pressure compressor 14a may be an axial compressor that includes one or more compressor stages each including a rotor and a stator. The high pressure compressor 14b is a centrifugal, or radial, compressor including an impeller 15 and a diffuser 20'. The impeller 15 receives air that has been compressed by the low pressure compressor 14a along an axial direction A relative to the central axis 11. The impeller 15 includes a plurality of blades defining passages between each adjacent pair of the blades. The impeller has an inlet 15a in which air enters in a direction generally parallel to an axial direction A relative to the central axis 11. According to an embodiment, the inlet 15a may lie in a plane to which the central axis 11 is normal. An outlet 15b may have an annular shape, such that air exits the outlet 15b in a generally radial direction R relative to the central axis 11. According to an embodiment, the outlet 15b is radially positioned relative to the central axis 11. The air within the high pressure compressor 14b, while being subjected to a pressure increase via its circulation in the passages of the impeller 15, changes direction from being generally axial to being generally radial.

The diffuser 20' of the centrifugal compressor 14b is used for redirecting the flow of compressed air that exits the impeller 15 of the high pressure compressor 14b from the radial direction R to the axial direction A relative to the central axis 11. Many diffusers may be used, such as vane diffusers or pipe diffusers. In the present embodiment, the diffuser 20' is of the pipe diffuser kind, but any suitable kind of diffuser may be used without departing from the scope of the present disclosure.

Figure 2:
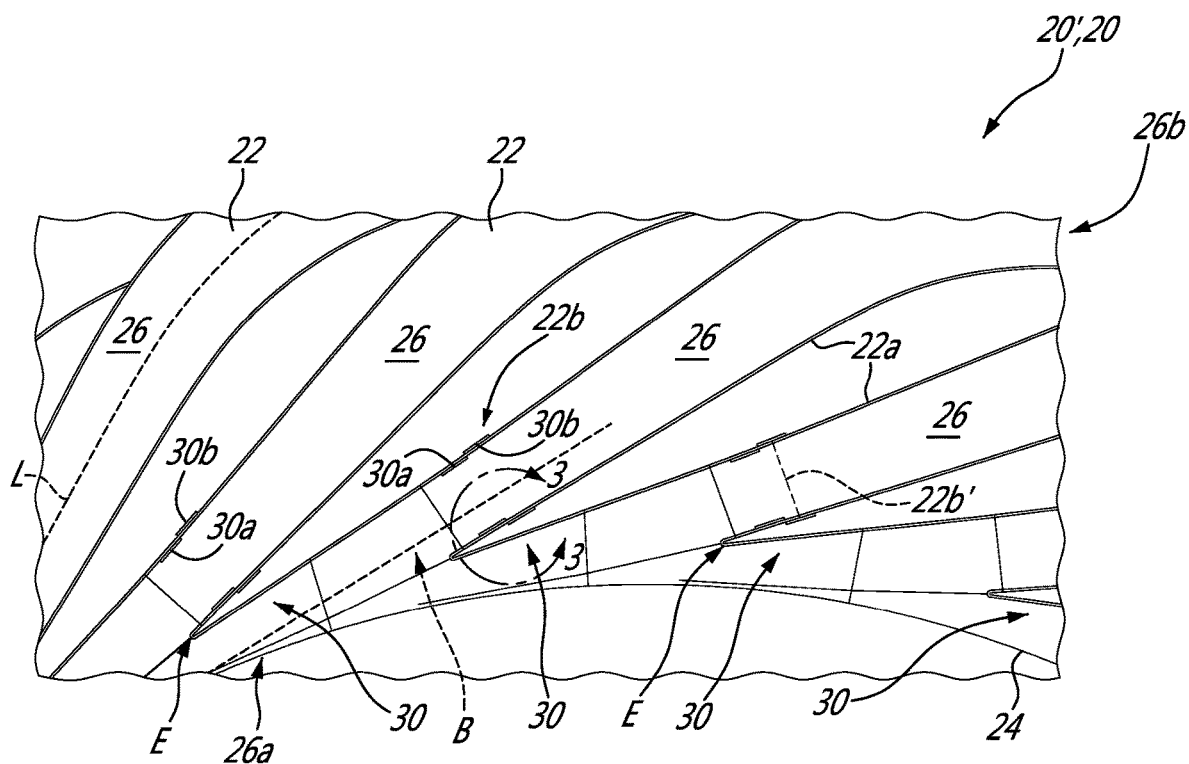
FIG. 2 is a schematic cross-sectional view of a diffuser pipe assembly of the gas turbine engine of FIG. 1 taken along a plane normal to a central axis of the engine of FIG. 1.

Referring more particularly to FIG. 2, a diffuser pipe assembly is generally shown at 20. The diffuser pipe assembly 20 may include diffuser pipes 22 and a diffuser case 24 to which the diffuser pipes 22 are secured. The diffuser case 24 extends circumferentially around the central axis 11 and is configured to be secured to an engine casing 25 (FIG. 1) of the gas turbine engine 10. The diffuser pipes 22 are secured to the engine casing 25 via the diffuser case 24. Each of the diffuser pipes 22 receives a portion of the flow, or a respective one of sub-flows, of compressed air from the outlet 15b of the impeller 15 and redirects it toward the combustor 16 (FIG. 1).

Each of the diffuser pipes 22 includes a wall 22a that bounds a flow passage 26. The wall 22a may be annular in cross section. The flow passage 26 has an inlet 26a and an outlet 26b. The portions of the flow each pass through throat regions 22b of the diffuser pipes 22. The throat regions 22b are defined as a location between the inlets 26a and outlets 26b of the flow passages 26 of the diffuser pipes 22 where a cross-sectional area undergoes a reduction for instance to reach its smallest area, or a smaller or reduced area. The throat regions 22b may or may not have an increase in cross-sectional area. Locations where the cross-sectional areas are the smallest are referred to as throats 22b' and are located within the throat regions 22b. Herein, a cross-sectional area is understood to mean an area of a cross-section of the diffuser pipe 22; the cross-section taken on a plane normal to a central longitudinal axis L of the diffuser pipes 22. The plane normal to the central longitudinal axis L may perpendicularly intersect the walls 22a of the flow passages 26 all around the flow passages 26.

Each of the diffuser pipes 22 has a leading edge E defined by an interaction of said diffuser pipe 22 and a circumferentially adjacent one of the diffuser pipes 22. In some cases, the throat 22b' may be located at the leading edge E.

At the throats 22b', the velocity of the fluid circulating in the diffuser pipes 22 is maximal and the pressure is minimal. In a particular embodiment, the velocity of the air in the diffuser pipes 22 may reach Mach 1 at the throats 22b'. As the cross-sectional areas of the diffuser pipes 22 increase downstream of the throats 22b', the velocity of the air in the diffuser pipes 22 may increase beyond Mach 1 and become supersonic. In a diffuser, the pressure ratio across the throat 22b' may not be high enough for the flow to reach supersonic speed. Consequently, the flow diffuses (slows down) and its pressure increases downstream of the throat 22b'.

In an embodiment, a throat region 22b is defined as including the section of the diffuser pipe 22 at which a decrease in cross-sectional area begins, to the smallest cross-sectional area (i.e., the throat 22b'). In another embodiment, a throat region is defined as including the section of the diffuser pipe 22 at which a decrease in cross-sectional area begins, and the section of the diffuser pipe 22 downstream of the smallest cross-sectional area exhibiting an increase in the cross-sectional area until the cross-sectional area is constant. In another embodiment, a throat region includes a portion of the diffuser pipe 22 immediately upstream of the throat 22b' and a portion of the diffuser pipe 22 immediately downstream of the throat 22b'.

In a particular embodiment, a cross-section of the diffuser pipe 22 has a circular shape or an oval shape. Other shapes may be used without departing from the scope of the present disclosure. The shape of the cross-section need not be uniform or similar from the inlet 26a to the outlet 26b of the flow passages 26 of the diffuser pipe 22. A distance along the flow passages 26 between the inlets 26a of the flow passages 26 and the throat regions 22b' may be less than that between the throat regions 22b and the outlets 26b of the flow passages 26 of the diffuser pipes 22. In a particular embodiment, a distance from the leading edges E of the flow passages 26 to the plasma actuators 30 ranges from 0 to 5 times a diameter of the diffuser pipes 22 at the throat 22b' downstream of the throat 22b'. In a particular embodiment, the distance from the leading edges E of the flow passages 26 to the plasma actuators 30 ranges from 0 to 3 times the diameter of the diffuser pipes 22 at the throats 22b'. In a particular embodiment, downstream ends of the throat regions 22b are located from 3 to 5 times the diameter of the diffuser pipes 22 at the throat 22b' from the leading edges E of the diffuser pipes 22. In other words, the throat regions 22b extend from the inlets 26a of the flow passages 26 to from 3 to 5 times the diameter of the flow passages 26 at the throat 22b' where a cross-sectional area is the smallest.

In a case wherein a cross-section of the flow passages 26 is not circular, a hydraulic diameter may be used. The hydraulic diameter corresponds to four times the area of the cross-section divided by its perimeter.

Typically, when optimizing compressor performance and surge margin, one would look at a conventional pipe diffuser design and compare it to another conventional pipe diffuser design, which might improve one characteristic at the expense of the other (e.g. increased surge margin but loss in efficiency). More specifically, when a compressor is pushed near its surge line, a separation of the flows, more specifically of boundary layers in vicinity of the diffuser leading edges E or on walls bounding the flow passages of the diffuser is increased until the flow is fully separated. This corresponds to the stall of the compressor and leads to the surge of the compressor.

In the depicted embodiment, one or more of the diffuser pipes 22 has at least one plasma actuator 30 positioned adjacent its wall 22a. The plasma actuator 30 may be secured to the wall 22a. The at least one plasma actuator 30 may be located closer to the impeller 15 than the outlet 26b of the flow passage 26. The at least one plasma actuator 30 may be located closer to the inlet 26a of the flow passage 26 than the outlet 26b of the flow passage 26. In an embodiment, all diffuser pipes 22 have one or more plasma actuators 30. The plasma actuators 30 are operatively connectable to a source of electricity S (FIG. 3), which may be for example, the electrical system of the gas turbine engine 10, or any external energy source. The plasma actuators 30 are configured to re-energize flow fields in boundary layers that develop near the walls 22a of the diffuser pipes 22. In the embodiment shown, the plasma actuators 30 are located in the throat regions 22b (e.g., such as at the throats 22b') of the diffuser pipes 22.

Flow separation within the diffuser pipes 22 typically occurs anywhere between the leading edges E of the diffuser 20 and downstream ends of the throat regions 22b. In a particular embodiment, locating the plasma actuators 30 between the leading edges E and the downstream ends of the throat regions 22b allows to more efficiently delay surge compared to a configuration where the plasma actuators are located elsewhere.

Figure 3:
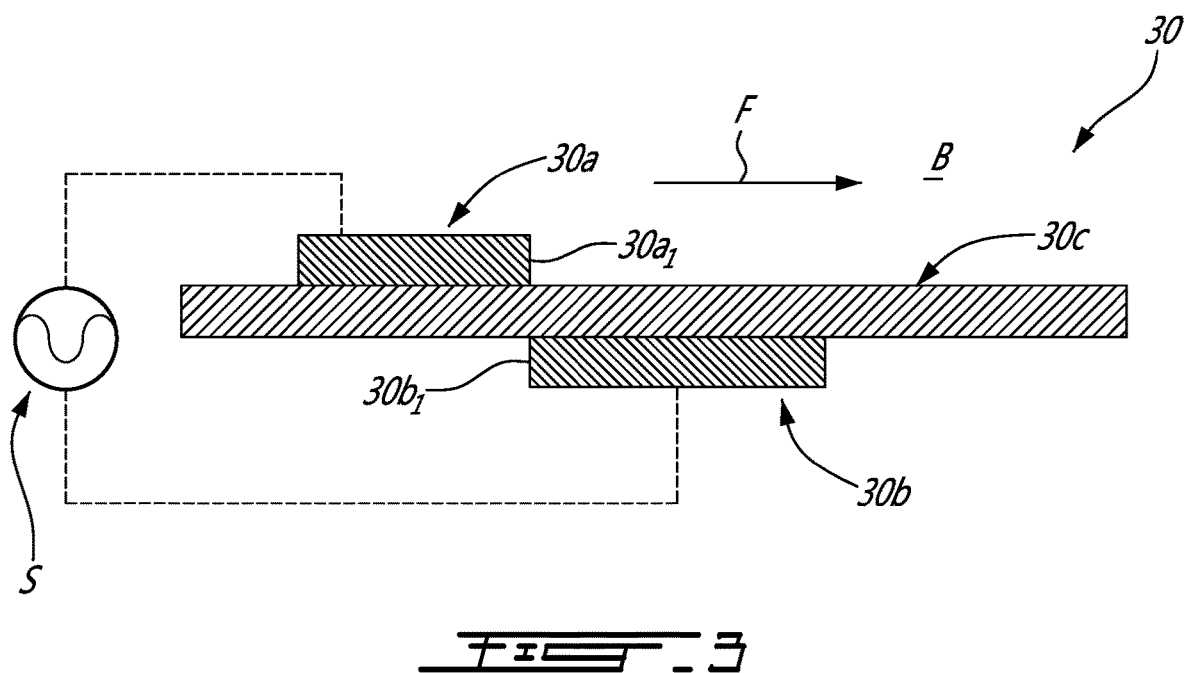
FIG. 3 is an enlarged view of zone 3-3 of FIG. 2 illustrating in greater detail one of plasma actuators of the diffuser pipe assembly.

Referring now to FIG. 3, one of the plasma actuators 30 is shown in greater detail. For the sake of clarity, only one of the plasma actuators 30 is described herein below using the singular form. It is understood that the below description may apply to all of the plasma actuators 30.

The plasma actuator 30 may include a first electrode 30a or cathode, a second electrode 30b or anode, and a layer of dielectric material 30c therebetween. The layer of dielectric material 30c may define a portion of the wall 22b of the diffuser pipe 22. In a particular embodiment, the diffuser pipes 22 are suitably machined in order to receive the plasma actuators 30 while limiting impact on surface continuity in order to avoid increasing drag within the diffuser pipes 22 compared to a diffuser pipe lacking such plasma actuators. The first and second electrodes 30a, 30b are disposed on opposite sides of the layer of dielectric material 30c. Stated differently, one of the electrodes 30a, 30b is inside the diffuser pipe 22, whereas the other electrodes 30a, 30b is outside the diffuser pipe 22. Both electrodes 30a, 30b are connectable to the source of electricity S, which may be a source of alternating current. The source of current may be batteries located in an aircraft equipped with the gas turbine engine 10. Alternatively, the source of current may be an auxiliary power unit of the aircraft. Any suitable source of current may be used without departing from the scope of the present disclosure.

When both electrodes 30a, 30b are connected to the source of electricity S, an electric field is created and joins the two electrodes 30a, 30b through the layer of dielectric material 30c. The electric field may ionize air molecules circulating therethrough that may thus be accelerated.

Referring to FIGS. 2-3, the first electrode 30a of the plasma actuator 30 is located upstream of the second electrode 30b relative to a flow direction F of the air circulating from the inlets 26a to the outlets 26b of the flow passages 26 of the diffuser pipes 22. The first electrodes 30a are exposed to the air in the diffuser pipes 22 whereas the second electrodes 30b are shielded from the air circulating in the flow passages 26 by the layer of dielectric material 30c. In the depicted embodiment, the first and second electrodes 30a, 30b extend circumferentially along a full circumference of the diffuser pipes 22. The second electrodes 30b may be aligned with the throats 22b' of the diffuser pipes 22. In other words, the second electrodes 30b of the plasma actuators 30 may overlap the throats 22b'. In an embodiment, both electrodes 30a and 30b are in the throat regions 22b of the diffuser pipes 22.

In the embodiment shown, a downstream end $30a_1$ of the first electrode 30a is aligned with an upstream end $30b_1$ of the second electrode 30b. In other words, the first and second electrodes 30a, 30b do not overlap. In yet other words, the electrodes 30a, 30b are asymmetric.

For operating the centrifugal compressor, a flow of air exiting the impeller 15 is received. The flow of air is separated in sub-flows and each of the sub-flows is received within a respective one of flow passages of the diffuser. Electric fields are generated in boundary layer regions B in vicinity of walls 22a bounding the flow passages 26 and at locations closer to the impeller 15 than to outlets 26b of the flow passage 26 thereby ionizing particles of air in the boundary layer regions B for accelerating the sub-flows in the boundary layer regions B.

In the depicted embodiment, each of the sub-flows is received in a respective one of the diffuser pipes 22. In the present embodiment, the sub-flows are accelerated at the throat regions 22b within the flow passages 26. As illustrated, the electric fields are generated by connecting the two electrodes 30a, 30b of the plasma actuators 30 to the source of electricity S.

In a particular embodiment, using plasma actuators in combination with a centrifugal compressor, which are less prone to stall/surge than axial compressors and which tend to consume less surge margin in the lower speeds (e.g., when accelerating from idle to take-off) than axial compressors, allows to meet OEI (One-Engine Inoperative) power requirements for turboshaft applications, which occurs at high corrected speeds where the stall margin would be controlled by rear stages, typically a centrifugal stage. This is different than axial compressors in which front stages, which are axial stages, control the overall surge margin.

In a particular embodiment, the plasma actuators 30 allow the control of the boundary layer near the wall 22a of the diffuser pipes 22. This might increase a surge margin of the compressor and might increase its efficiency compared to a diffuser lacking such plasma actuators. The disclosed diffuser 20' with plasma actuators 30 might offer more stall margin capability at a same operating point than a diffuser lacking plasma actuators. The plasma actuators 30 might re-energize the flow field in the boundary layer regions B and might cause the boundary layers to re-attach the walls 22a.

Figure 4:
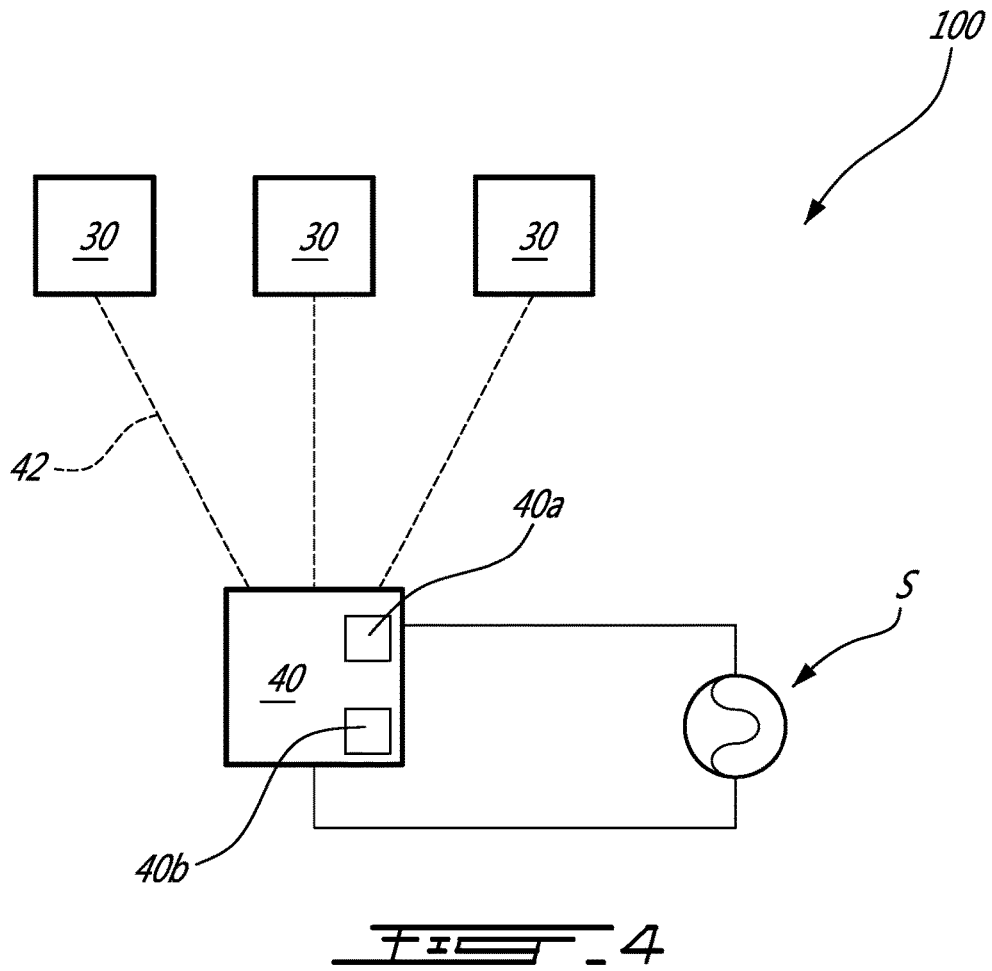
FIG. 4 is a schematic view of a stall control system in accordance with one embodiment.

Referring now to FIG. 4, a stall control system is generally shown at 100. The system 100 includes a controller 40 operatively connected to the plasma actuators 30 via suitable links 42. The controller 40 has a processor 40a and a computer readable medium 40b operatively connected to the processor 40a. The computer readable medium has instructions stored thereon for detecting an impending stall situation of the centrifugal compressor 14b and for activating the plasma actuators 30 for generating the electric fields between the first and second electrodes 30a, 30b (FIG. 3) of the plasma actuators 30. In a particular embodiment, the impending stall is assessed passively based on a pre-determined limit on compressor pressure ratio, acceleration rate and/or a rate of change of the power/thrust of the engine. In a particular embodiment, the impending stall is assessed actively via a live stall monitory systems that may use high-frequency response pressure probes. A combination of passive and active assessment of the impending stall may be used.

It is understood that the disclosed diffuser 20' may be used in any type of gas turbine engines, such as turboshafts and turboprops.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A stall control system for controlling stall of a centrifugal compressor of a gas turbine engine, the centrifugal compressor having an impeller and a diffuser downstream of the impeller, the stall control system comprising: plasma actuators located in boundary layer regions in vicinity of walls bounding respective flow passages of the diffuser, the plasma actuators located closer to inlets than outlets of the respective flow passages, the plasma actuators having a dielectric layer between first and second electrodes, the first electrodes being located upstream of the second electrodes, the first electrodes being exposed to the respective flow passages, the second electrodes being shielded from the respective flow passages by the dielectric layer, the plasma actuators operable to generate electric fields through the dielectric layer; and a controller operatively connected to the plasma actuators, the controller having a processor and a computer readable medium operatively connected to the processor, the computer readable medium having instructions stored thereon for:

detecting an impending stall situation of the centrifugal compressor, and activating the plasma actuators for generating electric fields between first and second electrodes of the respective plasma actuators.

2. The stall control system of claim 1, wherein the plasma actuators are located in respective throat regions of the flow passages of the diffuser.

3. The stall control system of claim 2, wherein the respective throat regions extend from inlets of the flow passages to from 3 to 5 times a diameter of the flow passages at a throat where a cross-sectional area is the smallest.

4. The stall control system of claim 2, wherein a throat region of the respective throat regions is defined as a section of each of the flow passages that extends from a location where a cross-sectional area starts to decrease to another location where the cross-sectional area is the smallest.

5. The stall control system of claim 2, wherein a throat region of the respective throat regions is defined as a section of each of the flow passages that extends from a location where a cross-sectional area starts to decrease to another location downstream of where the cross-sectional area is the smallest and where the cross-sectional area starts to be constant.

6. The stall control system of claim 1, wherein each of the flow passages defines a throat where a cross-sectional area of each of the flow passages is the smallest, the second electrodes overlap respective throats of the flow passages.

7. The stall control system of claim 1, wherein the diffuser is a pipe diffuser assembly including a plurality of diffuser pipes circumferentially distributed around the axis, each of the diffuser pipes having a pipe inlet fluidly connected to an outlet of the impeller and a pipe outlet fluidly connectable to a combustion chamber, the respective flow passages defined by the diffuser pipes.

8. The stall control system of claim 7, wherein the first and second electrodes circumferentially extend around a full circumference of each of the diffuser pipes.

9. The stall control system of claim 7, wherein each of the diffuser pipes includes a throat region, the plasma actuators located within the throat regions of the respective flow passages.

10. The stall control system of claim 7, wherein each of the diffuser pipes defines a leading edge at an inlet thereof, a distance from the leading edge to the plasma actuators ranging from 0 to 5 times a diameter of the diffuser pipes at a throat where a cross-sectional area of the diffuser pipe is the smallest.

11. The stall control system of claim 7, wherein the throat region is defined as a section of each of the diffuser pipes that extends from a location where a cross-sectional area starts to decrease to another location where the cross-sectional area is the smallest.

12. The stall control system of claim 7, wherein the throat region is defined as a section of each of the diffuser pipes that extends from a location where a cross-sectional area starts to decrease to another location downstream of where the cross-sectional area is the smallest and where the cross-sectional area starts to be constant.

13. The stall control system of claim 7, wherein each of the diffuser pipes defines a throat where the cross-sectional area of each of the diffuser pipes is the smallest, the second electrodes overlap throat regions of the respective flow passages.

* * * * *